United States Patent
Fricano

(10) Patent No.: US 9,297,177 B2
(45) Date of Patent: Mar. 29, 2016

(54) METHOD FOR VARIABLE REEF GENERATION OF ARTIFICIAL WAVES

(71) Applicant: Phillip James Fricano, Scottsdale, AZ (US)

(72) Inventor: Phillip James Fricano, Scottsdale, AZ (US)

(*) Notice: Subject to any disclaimer, the term of this patent is extended or adjusted under 35 U.S.C. 154(b) by 0 days.

(21) Appl. No.: 14/717,751

(22) Filed: May 20, 2015

(65) Prior Publication Data

US 2015/0252578 A1 Sep. 10, 2015

Related U.S. Application Data

(63) Continuation of application No. 12/804,482, filed on Jul. 22, 2010, now Pat. No. 9,175,488.

(51) Int. Cl.
*E02B 3/00* (2006.01)
*E04H 4/00* (2006.01)
*G09B 23/12* (2006.01)
*A47K 3/10* (2006.01)

(52) U.S. Cl.
CPC ............... *E04H 4/0006* (2013.01); *A47K 3/10* (2013.01); *G09B 23/12* (2013.01)

(58) Field of Classification Search
CPC . E04H 4/0006; A63B 69/125; A63B 69/0093
USPC .......... 405/25, 79; 4/491; 472/59, 90, 91, 128
See application file for complete search history.

(56) References Cited

U.S. PATENT DOCUMENTS

| 3,598,402 | A | | 8/1971 | Frenzl | |
|---|---|---|---|---|---|
| 5,219,315 | A | * | 6/1993 | Fuller et al. | 472/59 |
| 7,144,197 | B2 | * | 12/2006 | Black | 405/79 |
| 7,326,001 | B2 | | 2/2008 | McFarland | |

* cited by examiner

*Primary Examiner* — Sean Andrish
*Assistant Examiner* — Patrick Lambe
(74) *Attorney, Agent, or Firm* — Dorsey & Whitney LLP

(57) ABSTRACT

An open chamber of predetermined size and shape is positioned within a pool bed so as to contain interconnected clusters of interconnected telescopic modules which occupy the chamber area. Each of the telescopic modules is independently extended and retracted in length vertically by the increase or decrease of the volume of water contained within a bellows, establishing in selected telescopic modules a specific reef size, shape, and orientation. When kinetic-energy is introduced upstream from a source, the kinetic-energy within the water passes over the reef, and generates a wave having specific features resulting from the properties of the specific reef configuration.

20 Claims, 10 Drawing Sheets

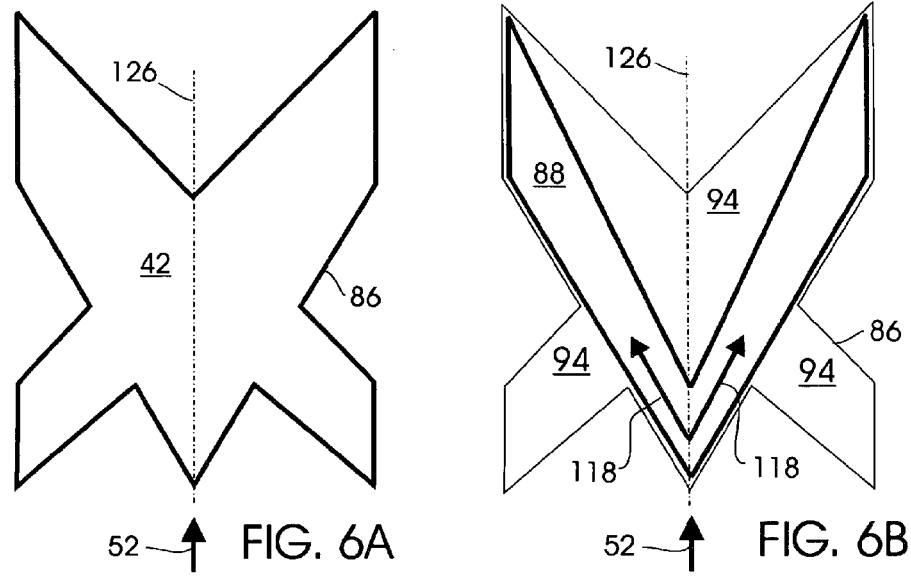
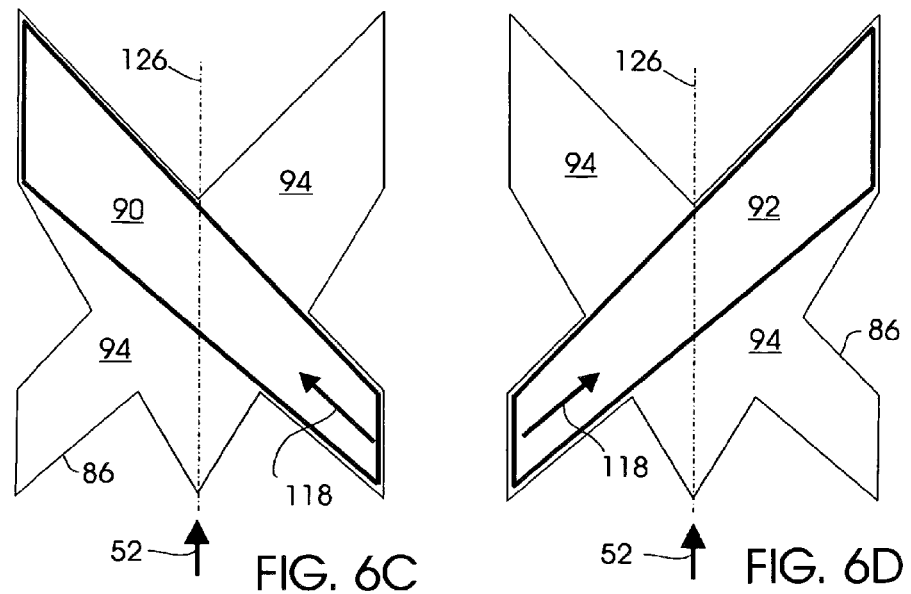

METHOD FOR VARIABLE REEF GENERATION OF ARTIFICIAL WAVES

CROSS-REFERENCE TO RELATED APPLICATION

This application is a continuation of U.S. patent application Ser. No. 12/804,482, filed Jul. 22, 2010, and issued on Nov. 3, 2015 as U.S. Pat. No. 9,175,488, which is incorporated by reference herein, in the entirety and for all purposes.

FIELD OF INVENTION

The present invention relates to artificial water wave generation in natural and man-made bodies of water for surfing.

BACKGROUND

Water waves occur in natural and artificial bathymetry. Wind, water current, and topographical features each and in combination thereof can cause the generation of waves. Relying on naturally occurring conditions and limitations in geographic location can greatly diminish availability, predictability, frequency and quality of waves sought in the art and sport of surfing. Attempts have been made to enhance wave size, shape and direction of peel to best meet the demands of the surfer. Artificial reefs have been successfully constructed thereby enhancing the waves generated by wind, topographic features and bathymetry. Such reefs are constructed using mathematical models under conditions of several variables, and consequently upon full-scale construction do not perform exactly as intended. Scale working models are utilized in testing reef size and configuration with promising results. However, when full-scale inventions are constructed at extensive cost, the performance is less than expected because of dynamic inconsistencies in the physics of bringing models to full-scale size. Most man-made reefs and all natural reefs are static and thereby exist in specific configuration resulting in drastically limited variation in wave generation. Rigid reef inventions that provide for variation in orientation and alignment with respect to a pool bed provide some variation in wave type, however they do not provide more than one direction of peel, they do not provide variation in the rate of peel of waves generated, nor do they provide for a near infinite combination or plurality of simultaneous waves.

In other prior art wave forming devices, attempts have been made to enhance wave size, wave shape, wave duration, and wave direction of peel by placing an adjustable weir onto the bed of the body of water, normal to the direction of flow. The specific incline to the weir and decline to the bed is basically a reef. The elevation of the weir with respect to the elevation of the bed is varied by means of hydraulic piston cylinders, pivot points or combination of both.

Other wave enhancing devices include rigid reef configurations that are suspended above the bed of the body of water at predetermined distances and predetermined angle of inclination with respect to the direction of water flow, thereby attempting to establish adjustment of the reef in juxtaposition to the bed, water flow, and water depth. Cables and or hydraulic pistons are interconnected, anchored onto the bed and onto the distal surface of the reef.

In other prior art wave forming devices, a wave is actually simulated in the water itself, rather than being defined by a surface over which a thin sheet of water flows. U.S. Pat. No. 6,019,547 of Hill, Feb. 1, 2000, describes a wave forming apparatus which attempts to simulate natural antidune formations in order to create waves. A water-shaping airfoil disposed within a flume containing a flow of water, and a wave-forming ramp is positioned downstream of the airfoil structure.

In other prior art arrangements, such as U.S. Pat. No. 6,928,670 B2 of Lochtefeld et al., Aug. 16, 2005, describes a moving reef wave generator that travels along the surface of a body of water, and preferably in the middle thereof, wherein the wave generator can create both primary and secondary wave that travel toward the shore. The primary waves are intended to allow surfing maneuvers to be performed in a relatively deep water environment. The secondary waves can break, wherein by modifying the shoreline's slope and curvature, and providing undulating peninsulas and cove areas, various multiple wave formations and effects can be created.

In the prior art of McFarland, U.S. Pat. No. 6,932,541 B2, Aug. 23, 2005, a plurality of a semi-rigid reef, referred to a weir, is interconnected in cantilever onto the bed of a pool of water at the upstream, leading end, having a predetermined abrupt incline and gentle downward slope at the downstream end. A secondary passageway extends through the bed form, with a first end adjacent the trailing end of the bed form, and a second end in the bed form upstream of the first end, thereby creating a pocket between the bed and underside of the hydraulic rams that independently control the lift of each cantilevered reef. A grating is provided between adjacent reefs to prevent inadvertent entry between the reefs and water return channels beneath. However, the grating provides the risk of collision with an occupant in the event of a fall in riding a wave. Furthermore, although the invention provides for some variation in wave size, it does not provide for variation in wave peel direction, wave type, wave size, or wave orientation. The flow of water current between wave cycles could create serious rip tides between and beneath the suspended reefs.

In the prior art of Hill, U.S. Pat. No. 6,019,547, Feb. 1, 2000, an airfoil chute or pool and an aerofoil structure shapes the flow of water generated by the chute and variable ramp. Although there is some variation in wave shape of the surfable wave, the rigid surface of both airfoil and ramp limits the variation in reef configuration and thusly wave type, size, and peel. Furthermore, the suspended configuration of the airfoil presents a safety hazard, causing an occupant to become lodged between the airfoil and pool bed.

In U.S. Pat. No. 6,928,670 B2 of Lochtefeld et al., Aug. 16, 2005, the moving reef traverses along the length of a pool near the surface of the water, pulled along a track fastened onto a pool bed. This moving device can be inadvertently impacted by the surfer resulting in serious injury. Even though the device moves, the rigid configuration greatly reduces the variation of wave generation types and direction of wave peel. To enhance wave size, the device must move at a greater rate of speed, thereby increasing the risk of bodily injury if impacted by the surfer. The mechanical means of connecting the moving reef device to the track system creates further risk of injury at the juncture of the moving reef's stem and tracking slot located between the track-mounted trolley and interconnecting moving reef. In testing a wave-generating invention at a scaled-down size, the outcome in full-scale engineering can result in failure. A full-scale production reef was constructed having a buoyant, rigid reef subtended by cables subtended from the distal face of the reef and anchored to a reinforced-concrete pool-bed. When tested, the wave energy generated an uplifting force sufficient enough to separate the attachment of the reef from the pool-bed, virtually pulling the anchored cables from the pool bed, causing millions of dollars in damage and severe delays in the project.

It is therefore an object of the invention to provide a variety of wave size.

It is another object of the invention to provide a variety in wave shape.

It is another object of the invention to provide a predetermined wave direction of peel.

It is another object of the invention to establish a predetermined rate of wave peel.

It is another object of the invention to reconfigure wave attributes of size, shape, and orientation in minimum time.

It is another object of the invention to program predetermined reef configurations thereby to program specific wave types.

It is another object of the invention to program predetermined reef configurations thereby to program specific wave direction of peel.

It is another object of the invention to program predetermined reef configurations thereby to program specific wave size.

It is another object of the invention to program predetermined reef configurations thereby to program specific wave duration.

It is another object of the invention to program predetermined reef configurations to generate more than one wave simultaneously.

It is another object of the invention to provide a reef that will respond to human impact if inadvertently struck, thereby reducing risk of bodily harm or injury.

It is another object of the invention to provide a chamber that will allow for water circulation of the pool.

It is another object of the invention to provide a chamber that will minimize down-time in repair or replacement of a defective module.

SUMMARY

In accordance with the present invention, there is provided a reef that is comprised of a plurality of a telescopic-module that is grouped in a plurality of interconnected clusters thereby establishing variations for the reef. As a means of establishing the domain of the plurality of the telescopic-module within the confines of a pool bed, a chamber is provided. The chamber is configured to a predetermined size, configuration, and depth below the elevation of the pool bed, thereby acting as a yoke to restrict lateral movement of the plurality of the telescopic-modules when acted upon by the kinetic-energy force of water passing above the entire domain.

The predetermined depth of the chamber is established so as to provide space in the vertically positioning of each the totality of the telescopic-module in a full-retracted posture with the proximal end of said telescopic-module within the same plane as the encompassing pool bed. Furthermore, the depth of the chamber is defined by the elevation of a chamber floor at a predetermined distance below the distal end of the plurality of the clusters so as to permit technicians to construct and maintain the individual modules from beneath the elevation of the pool bed, thereby omitting "down-time" in the event of repairs.

The domain of the telescopic-module provides a variety of reef shape, size, and orientation within the confines of the chamber, thereby providing a means of generating a variety of wave shape, size, orientation, direction of peel, and duration of peel. Each of the telescopic-modules is controlled independently so as to vary in height independently. When completely contracted, the telescopic-module height is aligned within the same plane as the circumventing pool bed thereby establishing a condition as if no reef exists. When a plurality of predetermined telescopic-module is selected and activated to "telescope" or extend upwardly, each at a progressive predetermined height, the telescopic-module group acts in totality to create a unique, predetermined reef thereto creating a specific wave generation.

Extension and retraction of each telescopic-module is accomplished, and controlled by a predetermined volume of water that is contained within a bellows interconnected within the confines of the telescopic-module. When the volume of water contained within the bellows is increased, the bellows elastically extends, thereby causing the telescoping-upper-body to elevate to a predetermined height above the plane of the encompassing pool bed. Conversely, when the volume of water contained within the bellows is depleted, the bellows elastically retracts, thereby causing the telescoping-upper-body to descend to a predetermined height above or at the plane of the encompassing pool bed. These variations in reef shape, size, and orientation provide for creating various wave types, size, direction of peel, duration of peel, single and multiple simultaneous wave generation.

In accordance with the direction of a kinetic-energy introduced to the water within the pool bed, a diagonal-left reef extends down-stream towards a beach traversing from right to left, thereby causing the kinetic-energy overpassing the diagonal-left-reef to generate a wave which will peel or break from right to left along a plateau of said diagonal-left-reef. Conversely, in accordance with the direction of the kinetic-energy introduced to the water within the pool bed, a diagonal-right-reef extends down-stream towards a beach traversing from the left to right, thereby causing the kinetic-energy overpassing the diagonal-right-reef-reef to generate the wave which will peel from left to right along the plateau of said diagonal-right-reef.

When a reef is configured in a vee shape with the vertex located at or near the centerline of the pool and upstream, convex to the direction of the kinetic-energy, the wave generated peels from the vertex in both directions along the plateau of the said vee-reef. The desired configuration, size, and orientation of any reef type is determined by means of testing at full-scale for the purpose of creating the optimum wave performance. Upon testing for each specific wave type, size, and orientation, the volume of water contained within each individual module is programmed into a computerized system for subsequent settings desired in reef shape, size, and orientation.

The cylindrical longitudinal shape of each set of three of the tangential adjoining telescopic-module provides a vertical equilateral concave triangular void. The void provides for circulation of water contained within the pool to pass downwardly through each of the void into the chamber and circulate from the chamber to a pumping filtration and purification system located outside the confines of the pool (not shown), thereto returning filtered and purified water to the pool (not shown).

BRIEF DESCRIPTION OF THE DRAWINGS

A complete understanding of the present invention may be obtained by reference to the accompanying drawings, when considered in conjunction with the subsequent, detailed description, in which:

FIG. 6A is a plan view of a chamber of predetermined shape, size, and location within the pool bed;

FIG. 6B is a plan view of a chamber showing within outline a predetermined vee-reef, a peel direction, and the kinetic-energy-direction;

FIG. 6C is a plan view of a chamber showing within outline a predetermined diagonal-left-reef, the peel direction, and the kinetic-energy direction;

FIG. 6D is a plan view of a chamber within outline a predetermined diagonal-right-reef, the peel direction, and the kinetic-energy direction;

For purposes of clarity and brevity, like elements and components will bear the same designations and numbering throughout the FIGURES.

DETAILED DESCRIPTION

Figure 1:
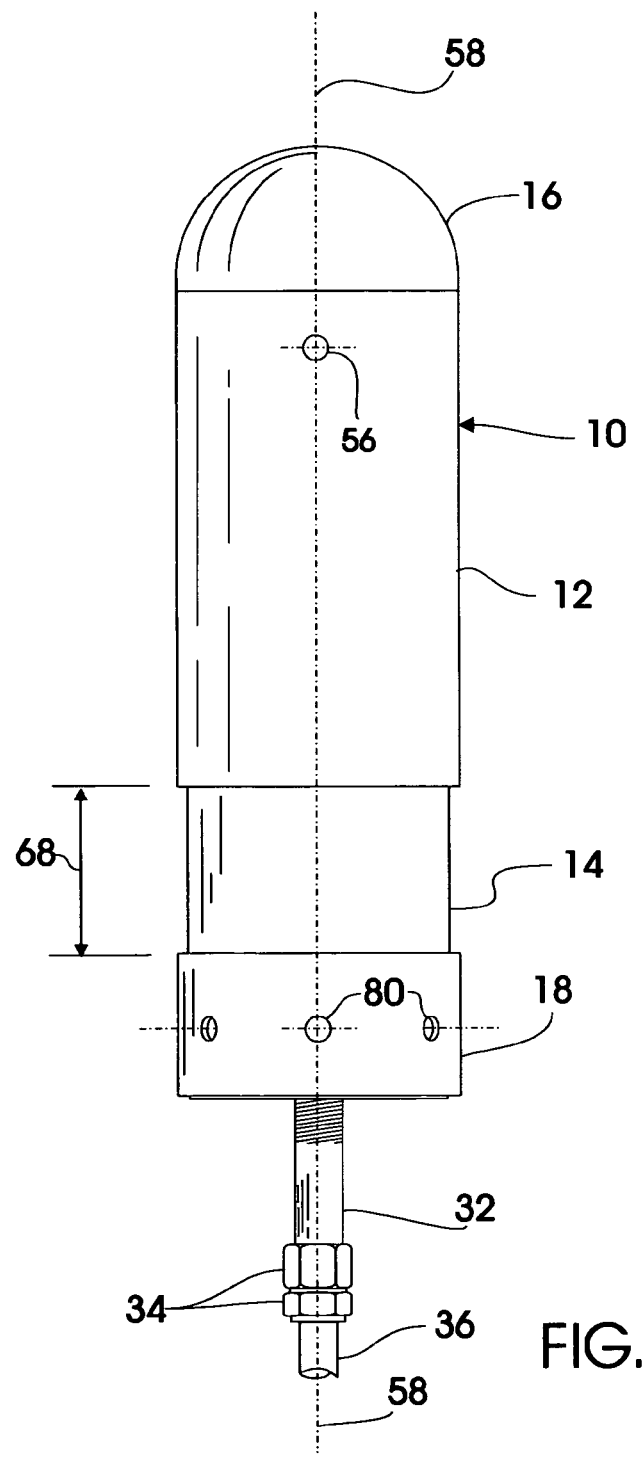
FIG. 1 is a side view of a telescopic-module partially extended as shown by a displacement of a telescoping-upper-body.

FIG. 1 is a side view of a telescopic-module 10 partially extended. As shown by a displacement 68 of a telescoping-upper-body 12, the telescopic-module 10 extension varies from a completely retracted-position 28 (shown in FIG. 3) to a completely extended-position 30 (shown in FIG. 2). Along a centerline 58, the proximal end of the telescopic-module 10 is comprised of a hollow hemispherical dome 16 made of an elastomeric material such as silicone so as to enhance compressibility if inadvertently impacted by a swimmer or surfer.

Figure 4:
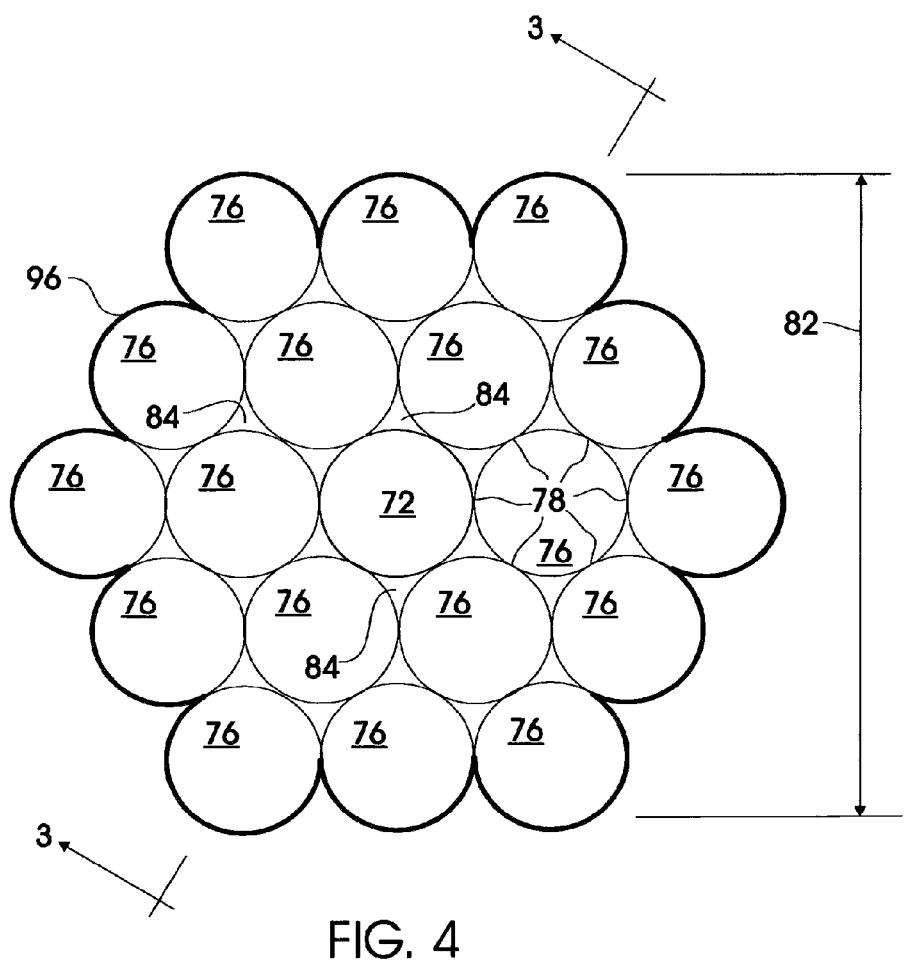
FIG. 4 is a top schematic view of a cluster of the telescopic-module showing the primary-module, and a plurality of the secondary-module.

Communicating with the dome 16 is the telescoping-upper-body 12. Longitudinally inserted within the telescoping-upper-body 12 is a stationary-lower-body 14 of predetermined outside diameter so as to provide slidability of the telescoping-upper-body 12 without causing lateral or concentric misalignment. The stationary-lower-body 14 is circumferentially fitted with a collar 18 of outside diameter equal to the outside diameter of the telescoping-upper-body 12. The collar 18 also provides for proper alignment of the adjoining stationary-lower-body 14, thereby providing parallel alignment for slidability of the telescoping-upper-body 12. The collar 18 provides an interface 78 at six circumferentially equidistant positions as generated by a geometric hexagonal matrix when the plurality of the telescopic-modules 10 is interconnected. Each interface 78 is comprised of a bore 80 at a predetermined location along the longitudinal axis of each of the collar 18 for the purpose of interconnecting the plurality of adjoining telescopic-modules 10 as shown in FIG. 4 to create a hexagonal cluster 82.

Figure 2:
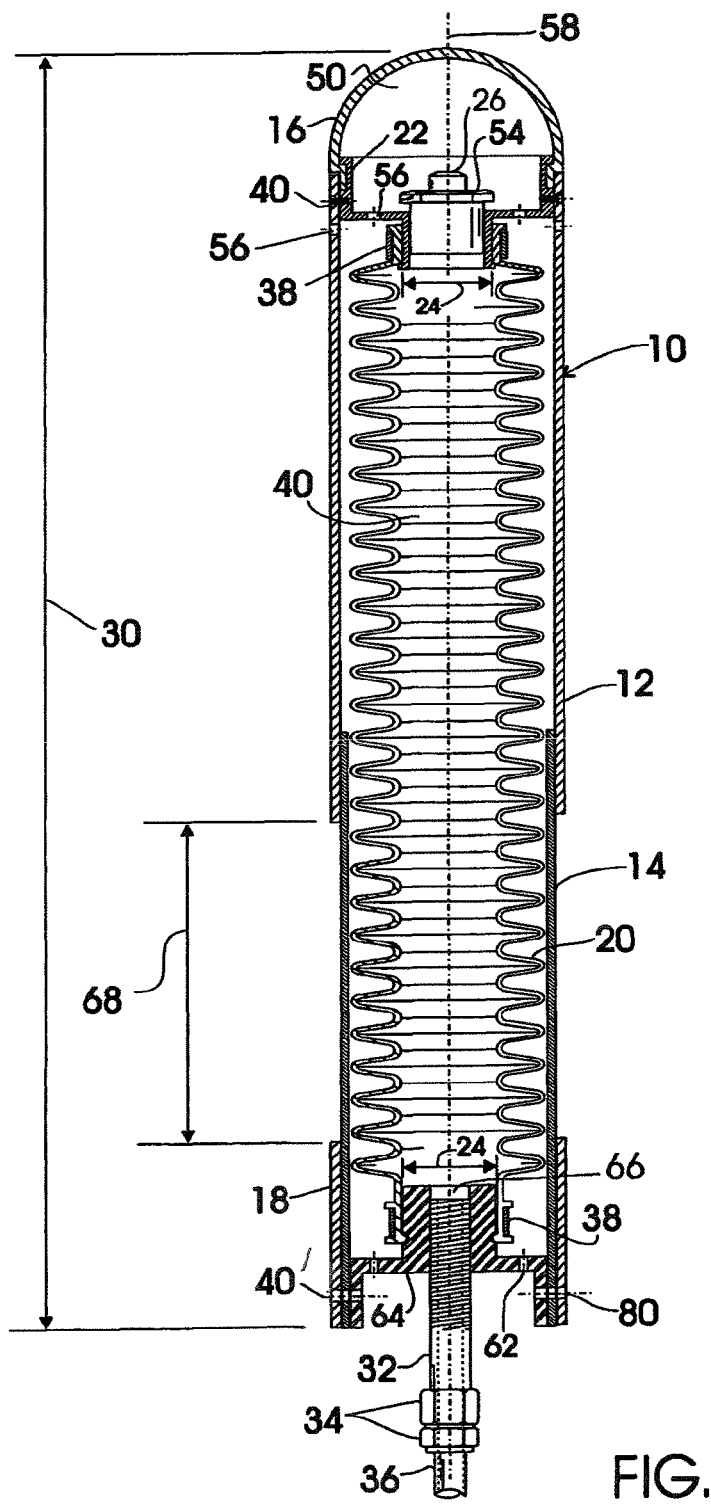
FIG. 2 is a longitudinal cross sectional view of a telescopic-module in a full extended position.

FIG. 2 is a longitudinal cross sectional view of the telescopic-module 10 in the full extended-position 30. The dome 16 of the telescopic-module 10 is captured within the telescoping-upper-body 12 by means of a proximal-retainer 22.

The proximal-retainer 22 also serves to insertibly mate with the proximal neck 24 of a bellows 20, which is secured onto the proximal-retainer 22 by means of a clamp 38. The proximal-retainer 22 also provides for attachment of an air-bleeder-valve 54 for the purpose of removing air trapped from within the bellows 20 during the initial start-up of the invention or at time of repair. Air trapped within the bellows 20 is evacuated through an orifice 26 of the air-bleeder-valve 54 and is released into a cavity 50 of the dome 16 by means of a plurality of air-bleeder-ports 56 located through the horizontal surface of the proximal-retainer 22 within the confines of the dome 16 and at a predetermined location toward the proximal end of the telescoping-upper-body 12.

Subsequent to bleeding, the cavity 50 within the hollow of the dome 16 will retain a volume of air. The cavity 50 of the dome 16 provides for collapse of the dome 16 upon inadvertent impact by a swimmer or surfer and memory of the elastic dome 16 will cause said dome 16 to return to a normal hemispherical shape. The air cavity 50 also provides for buoyancy, thereby reducing the "dead" load of the cluster 82 transmitted downwardly along the stationary-lower-body 14 of the primary-module 72 to the floor 46 of the chamber 42.

An assembly comprising the dome 16, the proximal-retainer 22, the air-bleeder-valve 54, the bellows 20, and the clamp 38 is insertibly mated with the telescoping-upper-body 12 and mechanically secured by means of a plurality of the fasteners 40. The assembly comprising the dome 16, the proximal-retainer 22, the air-bleeder-valve 54, the bellows 20, and the clamp 38 is insertibly mated within the stationary-lower-body 14 to a retracted-position 28 as shown in FIG. 3.

A distal-retainer 64 is provided to insertibly mate with the distal neck 24 of the bellows 20, which is secured by means of a second clamp 38. The distal-retainer 64 is comprised of a threaded-opening 66 of predetermined diameter to communicate with a threaded inlet-pipe 32, thereto communicating with a union 34 fitting thereto communicating with a water supply-tube 36. Another assembly comprising the distal-retainer 64, the distal end of the bellows 20, and the second clamp 38 is insertibly mated within the distal opening of the stationary-lower-body 14 and secured by means of a plurality of the fastener 40'.

Subsequent to the assembly comprising the distal-retainer 64, the distal end of the bellows 20 and the second clamp 38, the inlet-pipe 32 is threadibly inserted into the threaded opening of the distal-retainer 64. The union 34 is then connected detachably onto the inlet-pipe 32 and the water supply-tube 36. The supply-tube 36 attached to each of the telescopic-module 10 is sub-grouped and extended to a water volume control valve station (not shown) outside of the confines of the pool bed 124. As a means of reducing the risk of sand or other such debris from collecting onto the horizontal surface of the distal-retainer 64, within the assembly of the telescoping-lower-body and said distal-retainer 64, a plurality of a weep-holes 62 is provided through said horizontal surface.

Figure 3:
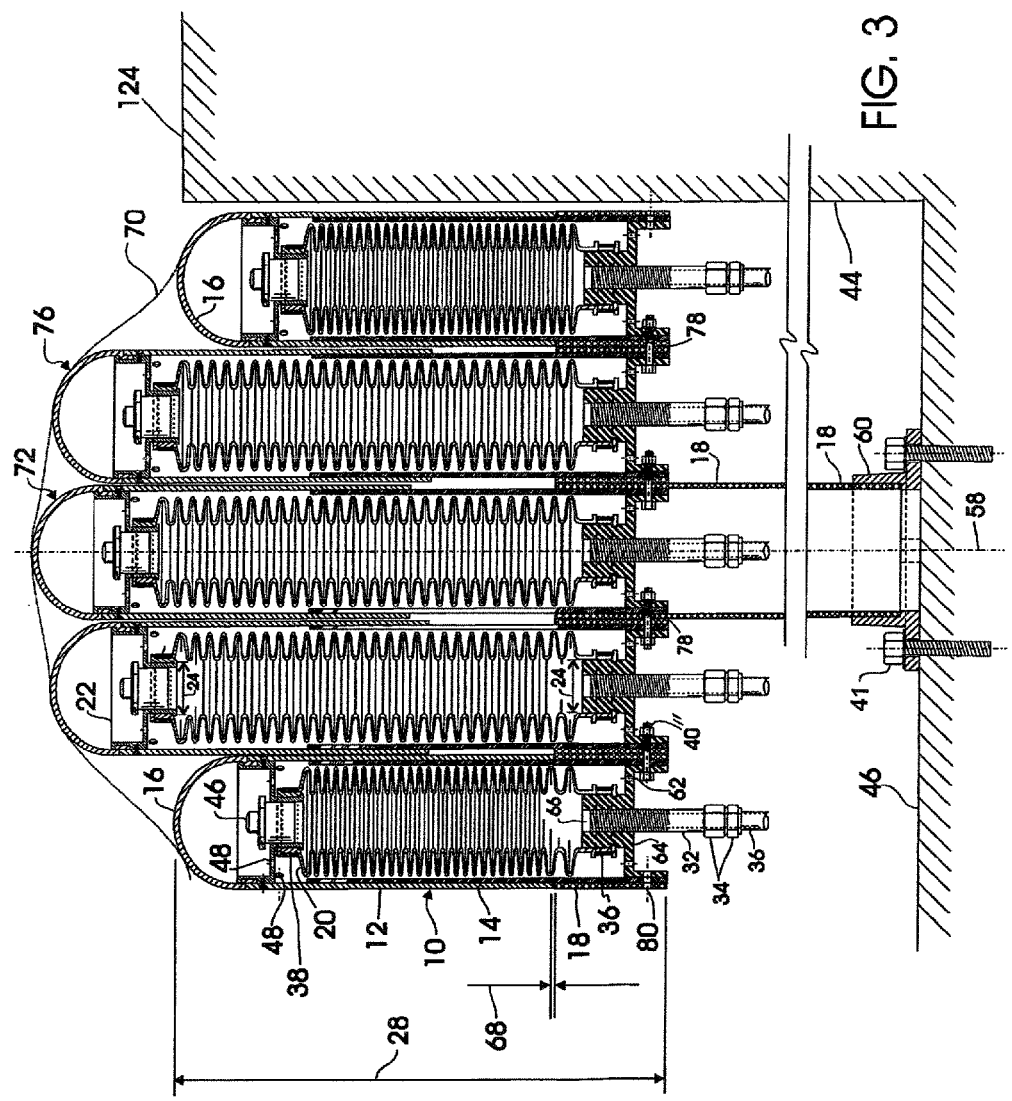
FIG. 3 is a longitudinal cross sectional view of a cluster of the telescopic-module.

FIG. 3 is a longitudinal cross sectional view of the cluster 82 of the telescopic-modules 10. The cluster 82 is comprised of the primary-module 72 and a plurality of the secondary-modules 76. Centered within the cluster 82 of a plurality of predetermined telescopic-modules 10 is a primary-module 72. Acting as a hub, the primary-module 72 is surrounded geometrically by a plurality of a secondary-modules 76.

All of the telescopic-modules 10 are interconnected with a plurality of a fastener 40" at each of the interface 78 locations. The fastener 40" is introduced through the bore 80 located in the cylindrical wall 44 of the distal-retainer 64, thereto communicating with the bore 80 located at the distal end of the stationary-lower-body 14, thereto communicating with the bore 80 located in the collar 18, passing through the bore 80 of the collar 18 of the adjoining telescopic-module 10, and communicating with the bore 80 of the adjoining stationary-lower-body 14, and communicating with the bore 80 of the cylindrical wall 44 of the adjoining distal-retainer 64, thereby mechanically attaching the adjoining telescopic-module 10.

The adjoining plurality of the cluster 82 of the telescopic-modules 10 creates a building-block for a reef-domain 86. The cluster 82 provides for establishing a means for having said cluster 82 pre-fabricated to enable the reef-domain 86 assembly to be of less effort and improved efficiency.

The stationary-lower-body 14 of the primary-module 72 extends downwardly a substantial predetermined distance beyond the stationary-lower-body 14 of the plurality of the surrounding secondary-module 76 of the cluster 82 and communicates with a base 60 shown in FIG. 3 which in turn is anchored onto a floor 46 of a chamber 42 by means of a plurality of the fasteners 41, thereby establishing and acting as a column to support the weight and maintain position of each of the clusters 82 to resist hydrodynamic forces generated by kinetic-energy 52 in a wave 114 generation process.

The configuration shows an independent predetermined extension of each of the telescopic-modules 10 for the purpose of establishing a predetermined profile 70. When all in the plurality of the cluster 82 are interconnected, the reef-domain 86, first shown in FIG. 6A, is established. When all of the telescopic-modules 10 are postured in the retracted-position 28 within the same plane as the pool bed 124, essentially there is no reef. When a predetermined selection of the telescopic-module 10 is configured in the predetermined profile 70, a specific shape, size, and oriented reef is established, thereto generating a conforming specific wave 114 when the water is acted upon by a kinetic-energy 52.

The cluster 82 shows the interface 78 of interconnecting telescopic-module 10 to the adjoining telescopic-module 10 by means of the fastener 40. The cluster 82 is structurally supported by the substantially longer collar 18 of the primary-module 72, and is anchored to the floor 46 of the chamber 42 by means of the base 60 thereto attached to the chamber 42 floor 46 by means of a plurality of the fastener 41.

FIG. 4 is a top schematic view of the cluster 82 of the telescopic-module 10 showing the primary-module 72, and a plurality of the secondary-modules 76. A cluster-perimeter 96 defines the general hexagonal geometric shape generated by a plurality of the encompassing secondary-modules 76. A series of two encompassing rows of the telescopic-modules 10 are shown. However, the number of concentric rows can vary from a single encompassment to two or more, thereto increasing the number of the secondary-modules 76 required from six to eighteen respectively, and so forth.

Each of the tangential adjoining telescopic-modules 10 establishes the interface 78. The area between each of the three adjoining telescopic-modules 10 creates an equilateral concave void 84. The void 84 provides a conduit for water circulation from the pool (not shown) into the chamber 42. Water is pumped from the chamber 42 to a purification and filtration system (not shown) outside the confines of the pool, and is thereto circulated back to the pool (not shown). Another purpose of the void 84 is to illuminate the water above the area of the reef from within the chamber 42 upwardly through the void 84 thereby creating a visual enhancement after dark. The illumination will also provide light necessary for repairs to the telescopic-module 10 from within the chamber 42.

Figure 5:
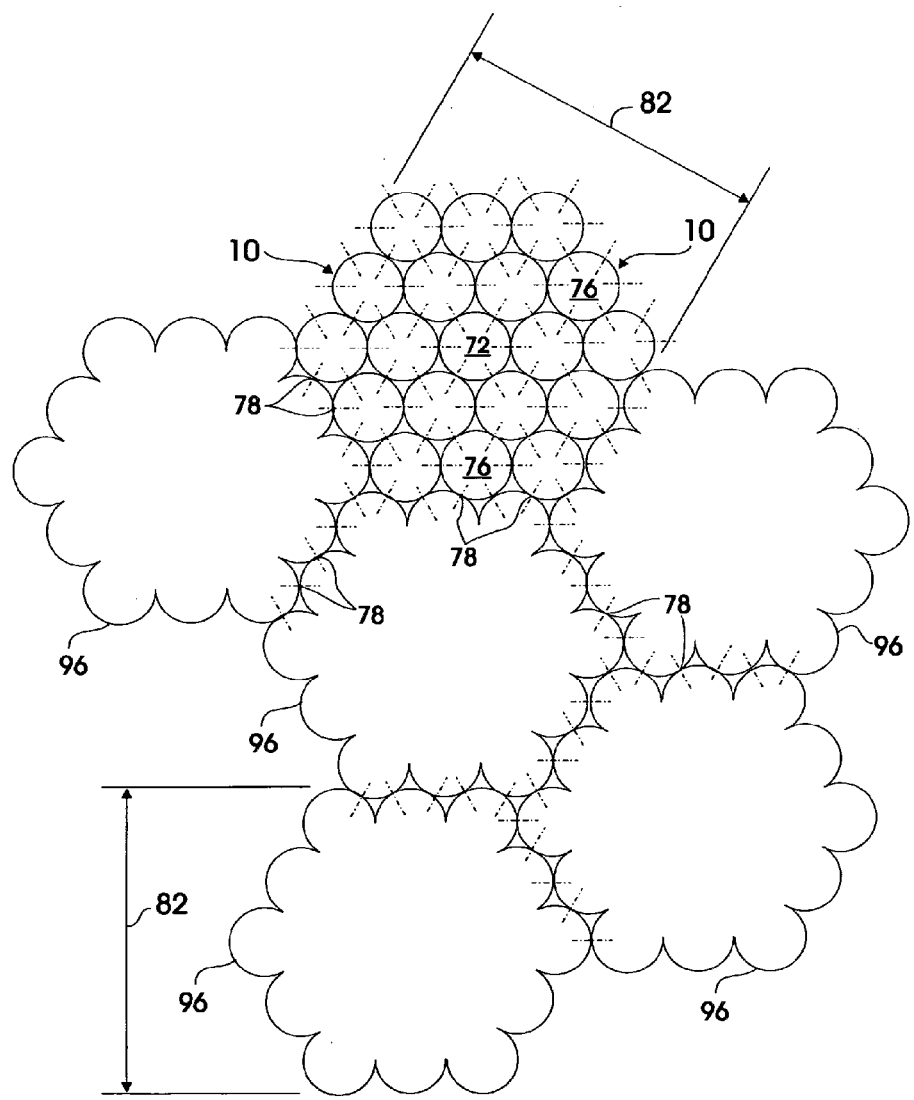
FIG. 5 is a top schematic view of a cluster of the telescopic-module, and the cluster-perimeter of the plurality of the clusters interconnected.

FIG. 5 is a top schematic view of the clusters 82 of the telescopic-modules 10, and the cluster-perimeter 96 of the plurality of clusters 82 interconnected. The interface 78 is the location for interconnection of each of the telescopic-module 10, and the adjoining cluster 82 by means of a plurality of the fastener 41. Juxtaposition of each of three of the tangentially adjoining telescopic-module 10 creates the void 84 which provides for water circulation from the pool (not shown) communicating with the chamber 42, to a water filtration system (not shown) and is recirculated back to the pool (not shown).

FIG. 6A is a plan view of the chamber 42 of predetermined shape, size, and location within the confines of the pool bed 124. The geometric configuration of the chamber 42, in lieu of a simple rectilinear perimeter, greatly reduces the number of the telescopic-modules 10 by omission of areas where the reef is not required, thereto providing a cost saving. The chamber 42 is comprised of a longitudinal axis-of-symmetry 126 parallel to a kinetic-energy 52 direction for providing a reciprocal of any configuration of the reef-domain 86, thereto providing a reciprocal in the peel 118 direction of the wave 114 generated. FIG. 6A is oriented for clarity so as to provide interpretation of the reader of the invention as being the surfer moving in the direction of the kinetic-energy 52.

FIG. 6B is a plan view of the chamber 42 showing within outline a predetermined vee-reef 88, a wave 114 peel 118 direction, and the kinetic-energy 52 direction. The vee-reef 88 is comprised of a proximal-slope 100, a plateau 104, and, a distal-slope 102, given in the respective sequence to the kinetic-energy 52 direction. The vee-reef 88 generates a wave 114 with the peel 118 beginning at the axis-of-symmetry 126, and a toe 98, and moving outwardly, and equidistantly in both directions as shown. The telescopic-module 10 located in the area established between the chamber-perimeter 48, and the vee-reef 88 are dormant, and remain in the full retracted-position 28.

FIG. 6B is oriented for clarity so as to provide interpretation of the reader of the invention as being the surfer moving in the direction of the kinetic-energy 52. The shape of the vee-reef 88 is not necessarily limited to be confined within the outline of FIG. 6B as this outline merely provides for a general configuration of the vee-reef 88, and the wave 114 generation option.

FIG. 6C is a plan view of the chamber 42 showing within outline a predetermined diagonal-left-reef 90, the peel 118 direction, and the kinetic-energy 52 direction. The diagonal-left-reef 90 is comprised of the proximal-slope 100, the plateau 104, and the distal-slope 102, given in the respective sequence to the kinetic-energy 52 direction. The diagonal-left-reef 90 generates a wave 114 with the peel 118 beginning at the right or toe 98 showing the direction of the peel 118.

FIG. 6C is oriented for clarity so as to provide interpretation of the reader of the invention as being the surfer moving in the direction of the kinetic-energy 52. The shape of the diagonal-left-reef 90 is not necessarily limited to be confined within the outline of FIG. 6C as this outline merely provides for a general configuration of the diagonal-left-reef 90, and the wave 114 generation option.

FIG. 6D is a plan view of the chamber 42 showing within outline a specific diagonal-right-reef 92, the peel 118 direction, and the kinetic-energy 52 direction. The diagonal-right-reef 92 is comprised of the proximal-slope 100, the plateau 104, and the distal-slope 102, given in the respective sequence to the kinetic-energy 52 direction. The diagonal-right-reef 92 generates a wave 114 with the peel 118 beginning at the left or toe 98 showing the direction of the peel 118.

FIG. 6D is oriented for clarity so as to provide interpretation of the reader of the invention as being the surfer moving in the direction of the kinetic-energy 52. The shape of the diagonal-right-reef 92 is not necessarily limited to be confined within the outline of FIG. 6D as this outline merely provides for a general configuration of the diagonal-right-reef 92, and the wave 114 generation option.

Figure 7:
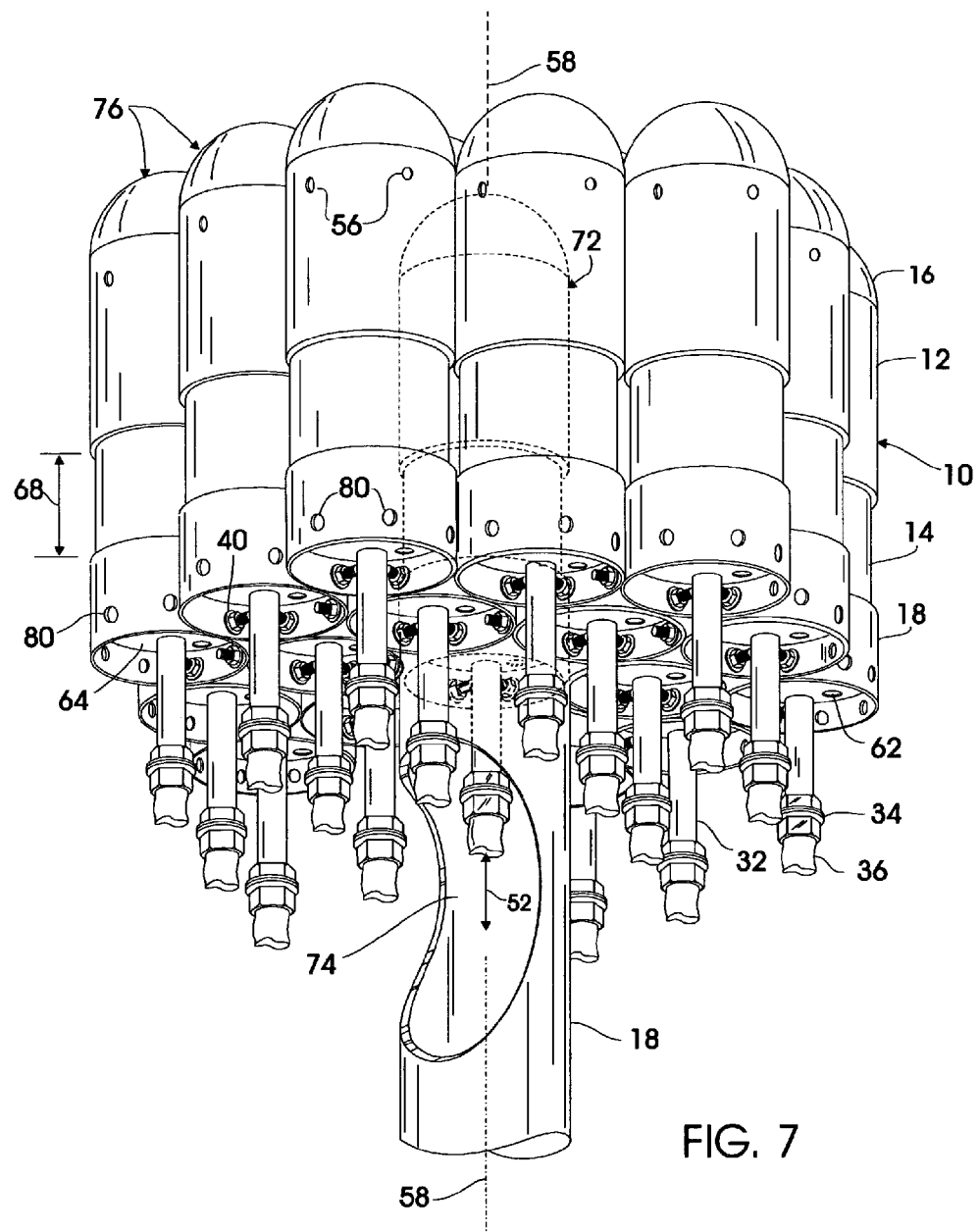
FIG. 7 is a perspective view of a cluster of the telescopic-modules showing the primary-module, and the plurality of the secondary-modules.

FIG. 7 is a perspective view of the cluster 82 of the telescopic-module 10 showing the primary-module 72, and a plurality of the secondary-modules 76. The collar 18 of the primary-module 72 extends downwardly communicating with the base 60 thereto communicating with the floor 46 of the chamber 42. The base 60 is anchored onto the floor 46 by means of a plurality of the fasteners 41, thereby preventing uplifting dynamic force caused by wave 114 generation across, and above the reef-domain 86.

An access-opening 74 within the collar 18 of the primary-module 72 is provided in proximity to the distal-retainer 64 for the purpose of assembly, and attachment of the distal end of the bellows 20, the distal-retainer 64, an inlet-pipe 32, a union 34, and transmission of the supply-tube 36. Each of the telescopic-modules 10 is operated independently for establishing variation in extension of said telescopic-module 10 thereto establishing variation in reef-domain 86. The prefabrication of each of the clusters 82 enhances and simplifies the assembly process of the telescopic-modules 10 and attachment of the base 60 to the floor 46 of the chamber 42.

Figure 8:
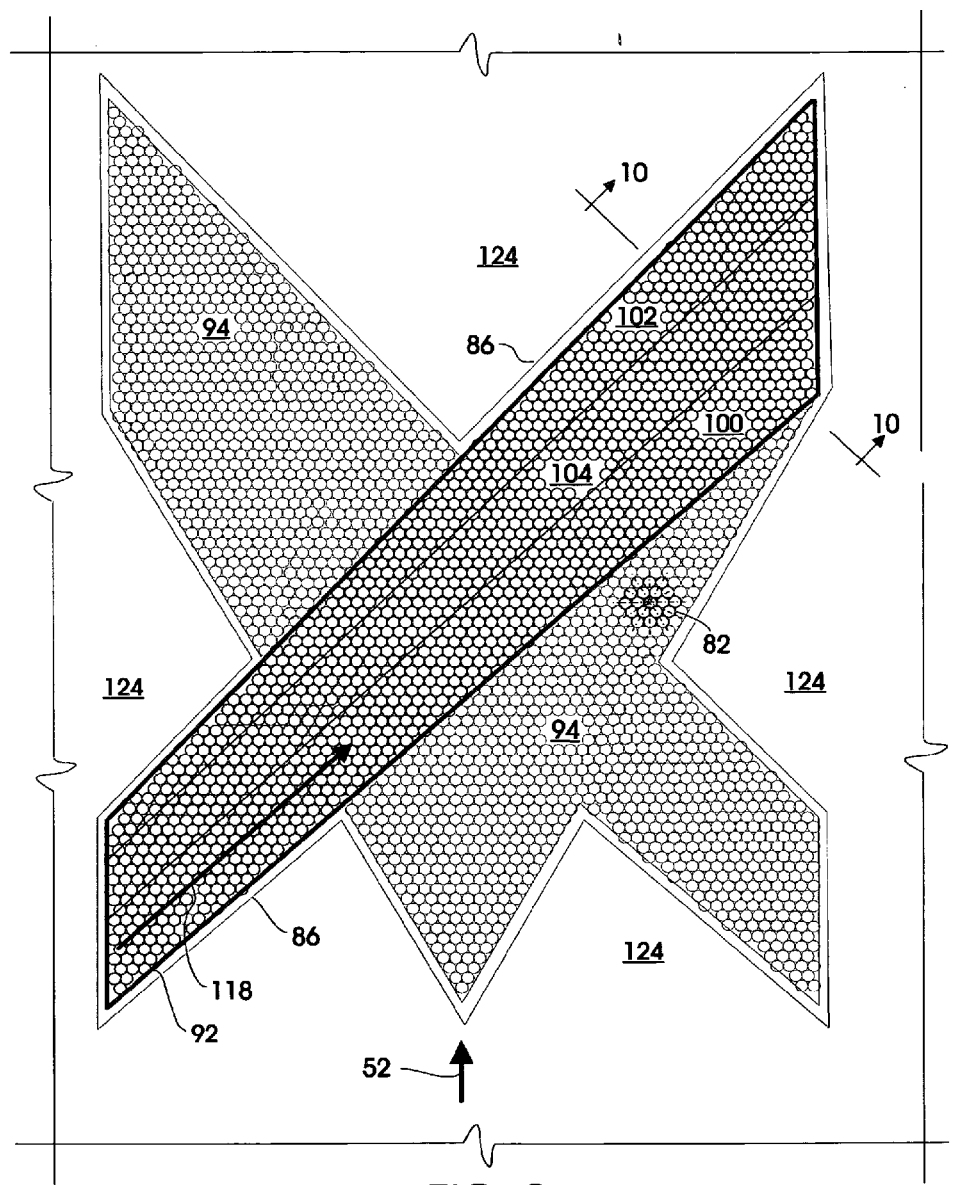
FIG. 8 is a plan view of a chamber within the confines of the pool bed.

FIG. 8 is a plan view of the chamber 42 within the confines of the pool bed 124. One of the clusters 82 positioned within the dormant-reef 94 field is defined independently for clarity. The diagonal-right-reef 92 is comprised of a series of three distinct planes comprising the proximal-slope 100, a plateau 104, and a distal-slope 102, given in the respective sequence to the kinetic-energy 52 direction.

FIG. 8 is oriented for clarity so as to provide interpretation of the reader of the invention as being the surfer moving in the direction of the kinetic-energy 52. The shape of the diagonal-right-reef 92 is not necessarily limited to be confined within the outline of the diagonal-right-reef 92, as this outline merely provides for a general configuration of the reef, and the wave 114 generation option.

Figure 9:
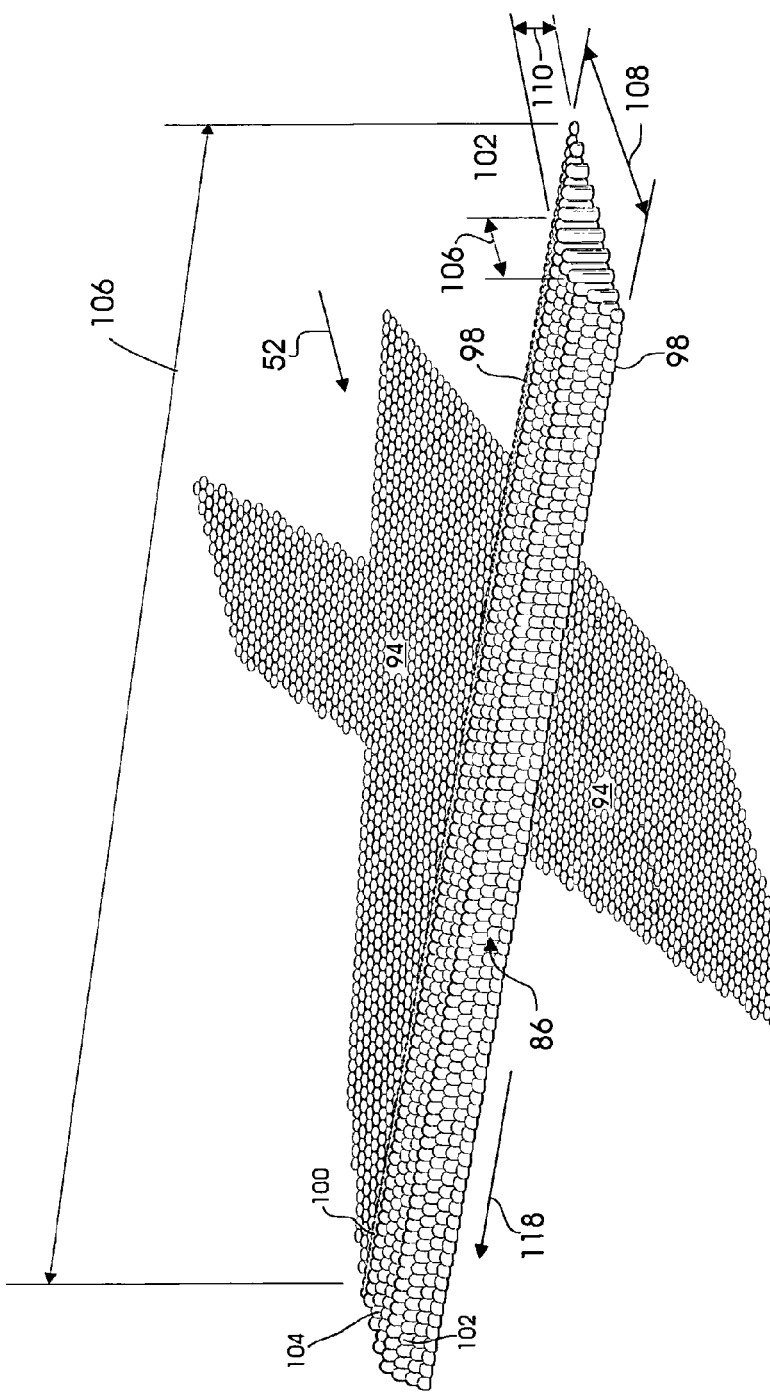
FIG. 9 is a perspective view of a chamber showing the predetermined diagonal-right-reef, the peel direction, and the kinetic-energy direction.

FIG. 9 is a perspective view of the chamber 42 showing the predetermined diagonal-right-reef 92, the peel 118 direction, and the kinetic-energy 52 direction. A length 106 of the diagonal-right-reef 92 is shown corresponding to a width 108 of the diagonal-right-reef 92. A height 110 of the diagonal-right-reef 92 represents the plateau 104 of said diagonal-right-reef 92. A dormant-reef 94 is shown outside the delineation of the diagonal-right-reef 92 which represents the plurality of the telescopic-module 10 which remain coplanar to the pool bed 124.

Figure 10:
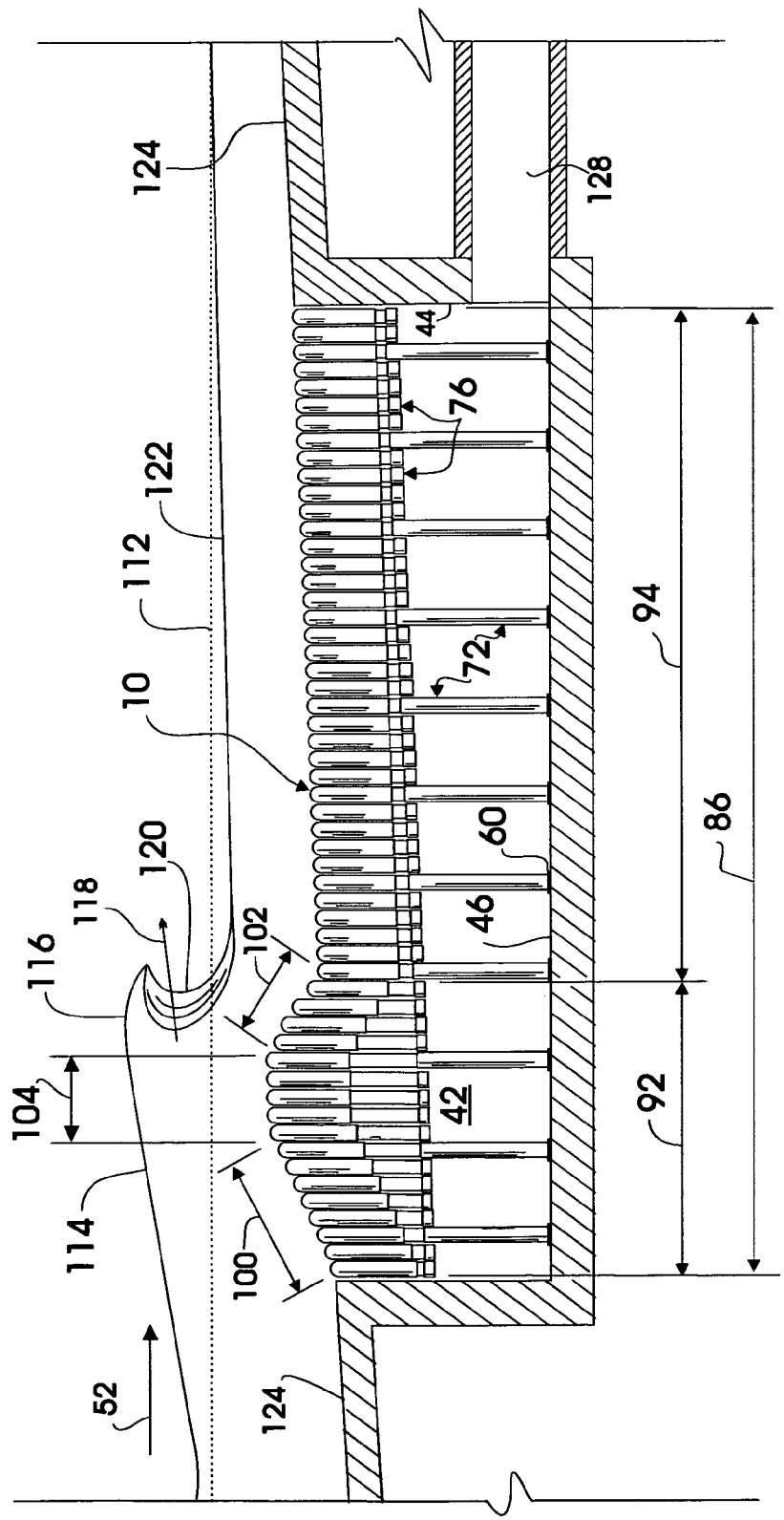
FIG. 10 is a cross sectional view of a chamber within the confines of the pool bed.

As water kinetic-energy 52 passes in the general direction as shown, the kinetic-energy 52 is confined by approach to the toe 98 along the length 106 of the proximal-slope 100, and continues to be further confined along said proximal-slope 100 to the plateau 104, causing the wave 114 to break, and create the peel 118 before passing beyond the distal-slope 102, as shown in FIG. 10. Any reef size, orientation, or configuration can be modified or changed from the diagonal-right-reef 92, the diagonal-left-reef 90, the vee-reef 88, or any combination or plurality thereof simply by increasing or decreasing the volume of water contained within the bellows 20 of each of the independently controlled telescopic-module 10.

FIG. 10 is a cross sectional view of the chamber 42 within the confines of the pool bed 124. The chamber 42 is comprised of a wall 44 thereto communicating with the floor 46 of the chamber 42 for establishing the reef-domain 86. Furthermore, communicating with the wall 44 of the chamber 42 is a raceway 128, thereto communicating with a water volume control station (not shown) located outside the confines of the pool.

The plurality of the supply-tube 36 bus (not shown) is extended from each of the telescopic-modules 10 to the water volume control station (not shown) beyond the confines of the chamber 42 through the raceway 128. The raceway 128 also provides for chamber 42 access during construction, and maintenance of the plurality of the telescopic-modules 10. The water volume supplied or withdrawn to or from each of the telescopic-module 10 is controlled independently by means of a computerized valve system, causing the bellows 20 to extend or retract respectively, thereto causing the telescopic-module 10 to extend or retract respectively. The totality of telescopic-modules 10 within the confines of the chamber 42 are programmed to either remain in part with a predetermined dormant-reef 94, or are programmed to establish the predetermined size, and shape of a specific reef, or plurality of reefs.

The basic reef configurations are shown in FIG. 6B, FIG. 6C, and FIG. 6D. The predetermined diagonal-right-reef 92 is shown communicating with the dormant-reef 94. The collar 18 of the plurality of the primary-module 72 extends downward to communicate by means of the base 60 to the chamber 42 floor 46. Much like the stem of a flower supporting the pedals of the flower, the collar 18 of the primary-module 72 supports the subtended plurality of the secondary-modules 76.

As the kinetic-energy 52 within the water passes over and along the length 106 of the diagonal-right-reef 92, the elevation and plane of a static-water-line 112 is disrupted by the wave 114 kinetic-energy 52, thereby creating a dynamic-water-line 122 from the static-water-line 112 to generate a crest 116. In passing beyond the plateau 104 and along the distal-slope 102 of the diagonal-right-reef 92, the wave 114 begins the peel 118 and a face 120 of the wave 114 is created, thereto providing a "barrel" or riding surface for the surfer as the wave 114 continues to generate the peel 118 and finally decay toward a beach (not shown).

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

The invention claimed is:

1. A method of generating an artificial wave, the method comprising:
  controlling a plurality of telescoping modules to remain generally coplanar with a pool bed or to establish an artificial reef structure in the pool bed, the artificial reef structure having a stationary profile defining a series of at least three distinct surface regions, each comprising a proximal slope, a plateau, and a distal slope given in respective sequence to a kinetic energy direction of the artificial wave; and
  generating the artificial water wave with a crest, a face and a peel, wherein kinetic energy in a generated artificial water wave approaches a toe along a length of the proximal slope to the plateau of the artificial reef structure, the artificial water wave breaking along the plateau of the artificial reef structure to create the peel passing beyond the distal slope;
  wherein a selected set of the plurality of telescoping modules is extended to progressive, stationary, heights to establish the profile of the artificial reef structure in the pool bed, the proximal slope, the plateau, and the distal slope comprised of a matrix of adjacent telescoping modules extended at the progressive, stationary heights to generate the artificial water waves when acted upon by the kinetic energy; and wherein the plurality of telescoping modules are configurable to be positioned in a plurality of variable, overlapping subsets extended or retracted to define the at least three distinct surface regions.

2. The method of claim 1, further comprising anchoring to the pool bed a primary telescopic module acting as a hub for a plurality of surrounding secondary telescoping modules in a hexagonal matrix.

3. The method of claim 2, wherein at least one of the plurality of telescoping modules is configured as a primary module surrounded by a plurality of adjoining secondary modules.

4. The method of claim 3, further comprising circulating water through a plurality of voids defined between the adjoining modules.

5. The method of claim 1, further comprising modifying the profile of the artificial reef structure by increasing or decreasing a predetermined volume of water contained within the telescopic modules.

6. The method of claim 5, further comprising retracting all of the telescopic modules within a plane of the pool bed, wherein the artificial reef structure is absent.

7. The method of claim 1, further comprising controlling a predetermined volume of water supplied to the selected set of telescoping modules, wherein the telescoping modules in the selected set retract or extend to the progressive, stationary heights.

8. The method of claim 7, further comprising supplying the predetermined volume of water to a bellows comprised within each of the telescopic modules within the selected set.

9. The method of claim 7, further comprising bleeding air from the plurality of telescoping modules.

10. The method of claim 9, further comprising retaining a predetermined volume of air in each of the selected set of telescoping modules, wherein the air provides buoyancy.

11. The method of claim 10, further comprising retaining the predetermined volume of air in a cavity defined in a hollow dome in each of the selected set of the telescoping modules, wherein the cavity provides for temporary collapse of the dome upon inadvertent impact by a swimmer or surfer.

12. A method of generating an artificial water wave, the method comprising:

independently extending or retracting a plurality of telescoping modules having a telescopic upper body and a stationary lower body member, wherein a primary telescoping module having a stationary lower body member is anchored to a chamber floor in a matrix within the chamber floor positioned below a bed of a pool having walls to contain water therein;

positioning some or all of the telescoping modules to remain generally coplanar with the bed of the pool or in a predetermined stationary profile established at progressive heights to form an artificial reef structure defining a series of at least three distinct surface regions, each comprising a proximal slope, a plateau, and a distal slope comprised of adjacent telescoping modules positioned at the progressive heights; and passing kinetic energy of the artificially generated water wave over the artificial reef structure defined within the pool, wherein the artificial reef structure is configured in the profile to generate the water wave with a crest and a peel when acted upon by the kinetic energy;

wherein the plurality of telescoping modules are configurable to be positioned in a plurality of variable, overlapping subsets extended or retracted to define the at least three distinct surface regions.

13. The method of claim 12, wherein the kinetic energy in each of the artificially generated water waves approaches a toe of the artificial reef structure, the artificially generated water waves breaking along the plateau to create the peel.

14. The method of claim 13, further comprising the artificially generated water waves continuing to generate the peel in passing beyond the plateau and along the distal slope of the artificial reef structure.

15. The method of claim 14, further comprising performing surfing maneuvers on the artificially generated water waves.

16. The method of claim 15, further comprising the artificially generated water waves decaying toward a beach.

17. The method of claim 12, further comprising controlling a predetermined water volume supplied to each of the plurality of telescoping modules, wherein the adjacent telescoping modules are extended at the progressive heights to define the profile of the artificial reef structure.

18. The method of claim 17, further comprising bleeding air from the plurality of telescoping modules, wherein a predetermined volume of air is retained in a hollow dome of each of the adjacent telescoping modules to provide buoyancy.

19. The method of claim 17, further comprising modifying the profile of the artificial reef structure by increasing or decreasing the predetermined volume of water contained within a bellows of a predetermined selection of the telescopic modules.

20. The method of claim 17, further comprising programming the plurality of telescopic modules within the chamber to establish a variety of profiles of the artificial reef structure, wherein a desired reef configuration, size, and orientation is determined by means of testing at full-scale for creating optimum wave performance, and whereupon testing for each specific wave type, size, and orientation, a volume of water contained within each individual telescoping module is programmed into a computerized system for subsequent settings in each desired reef configuration, size, and orientation.

* * * * *